(12) United States Patent
Graham

(10) Patent No.: US 7,228,492 B1
(45) Date of Patent: Jun. 5, 2007

(54) 2D GRAPH DISPLAYING DOCUMENT LOCATIONS OF USER-SPECIFIED CONCEPT OF INTEREST

(75) Inventor: Jamey Graham, Los Altos, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/348,652

(22) Filed: Jul. 6, 1999

(51) Int. Cl.
G06F 7/00 (2006.01)

(52) U.S. Cl. ............... 715/500; 715/515; 345/440; 345/442

(58) Field of Classification Search ............... 707/500, 707/529, 531; 345/684, 689, 440, 442; 715/500, 715/529–531, 501.1, 513, 515
See application file for complete search history.

(56) References Cited

U.S. PATENT DOCUMENTS

| | | |
|---|---|---|
| 4,417,239 A | 11/1983 | Demke et al. |
| 4,823,303 A | 4/1989 | Terasawa |
| 5,153,831 A | 10/1992 | Yianilos |
| 5,297,042 A | 3/1994 | Morita |
| 5,309,359 A | 5/1994 | Katz et al. |
| 5,349,658 A | 9/1994 | O'Rourke et al. |
| 5,384,703 A | 1/1995 | Withgott et al. |
| 5,404,295 A | 4/1995 | Katz et al. |
| 5,418,948 A | 5/1995 | Turtle |
| 5,442,795 A | 8/1995 | Levine et al. |
| 5,479,600 A | 12/1995 | Wroblewski et al. ....... 345/787 |
| 5,481,666 A | 1/1996 | Nguyen et al. |
| 5,530,942 A * | 6/1996 | Tzou et al. ................. 707/512 |
| 5,546,502 A | 8/1996 | Hart et al. |
| 5,596,700 A | 1/1997 | Darnell et al. |
| 5,638,543 A | 6/1997 | Pedersen et al. |
| 5,680,636 A | 10/1997 | Levine et al. |
| 5,694,559 A | 12/1997 | Hobson et al. |
| 5,721,897 A | 2/1998 | Rubinstein et al. |
| 5,721,902 A | 2/1998 | Schultz |
| 5,737,599 A | 4/1998 | Rowe et al. |

(Continued)

FOREIGN PATENT DOCUMENTS

DE 198 59 180 A1 12/1998

(Continued)

OTHER PUBLICATIONS

Card et al, "Readings in Information Visualization Using Vision to Think", Morgan Kaufmann Publishers, Jan. 25, 1999, pp. 236-243.*

(Continued)

Primary Examiner—Cesar Paula
(74) Attorney, Agent, or Firm—Townsend and Townsend and Crew

(57) ABSTRACT

According to one embodiment of the present invention, methods and systems for displaying an interest profile for an electronically stored document are provided. Interest profiles provide features that can enhance the experience of reading or using the electronic document. In exemplary embodiments, methods and systems include one or more interest profile techniques, such as graphical presentations and the like, for browsing or searching documents are provided. The graphical presentation can provide information about content of a document. The invention can be embodied in computer systems that include user input devices, processors, displays, storage and the like.

31 Claims, 10 Drawing Sheets
(7 of 10 Drawing Sheet(s) Filed in Color)

U.S. PATENT DOCUMENTS

| | | | |
|---|---|---|---|
| 5,748,805 | A | 5/1998 | Withgott et al. |
| 5,751,283 | A | 5/1998 | Smith |
| 5,751,287 | A | 5/1998 | Hahn et al. ............... 345/775 |
| D395,297 | S | 6/1998 | Cheng et al. |
| 5,761,655 | A | 6/1998 | Hoffman |
| 5,768,578 | A * | 6/1998 | Kirk et al. ............... 707/100 |
| 5,778,363 | A | 7/1998 | Light |
| 5,778,397 | A | 7/1998 | Kupiec et al. |
| 5,781,785 | A | 7/1998 | Rowe et al. |
| 5,784,616 | A | 7/1998 | Horvitz |
| D398,299 | S | 9/1998 | Ballay et al. |
| 5,806,079 | A | 9/1998 | Rivette et al. |
| D400,195 | S | 10/1998 | Utesch |
| 5,819,301 | A | 10/1998 | Rowe et al. |
| D400,520 | S | 11/1998 | Baker et al. |
| 5,832,474 | A | 11/1998 | Lopresti et al. |
| 5,838,317 | A | 11/1998 | Bolnick et al. |
| 5,838,323 | A * | 11/1998 | Rose et al. ............... 707/526 |
| 5,847,709 | A | 12/1998 | Card et al. |
| 5,857,185 | A | 1/1999 | Yamaura |
| 5,860,074 | A | 1/1999 | Rowe et al. |
| 5,870,770 | A | 2/1999 | Wolfe |
| 5,873,107 | A | 2/1999 | Borovoy et al. |
| 5,933,841 | A | 8/1999 | Schumacher et al. |
| 5,943,679 | A | 8/1999 | Niles et al. |
| 5,946,678 | A | 8/1999 | Aalbersberg |
| 5,950,187 | A | 9/1999 | Tsuda |
| 5,987,454 | A | 11/1999 | Hobbs |
| 6,006,218 | A | 12/1999 | Breese et al. |
| D418,826 | S | 1/2000 | Pavely et al. |
| D419,144 | S | 1/2000 | Baker et al. |
| 6,021,403 | A | 2/2000 | Horvitz et al. |
| 6,026,409 | A | 2/2000 | Blumenthal |
| 6,028,601 | A | 2/2000 | Machiraju et al. |
| 6,055,542 | A | 4/2000 | Nielsen et al. |
| D424,036 | S | 5/2000 | Arora et al. |
| D425,039 | S | 5/2000 | Shields |
| D425,497 | S | 5/2000 | Eisenberg et al. |
| 6,057,839 | A * | 5/2000 | Advani et al. ............... 345/784 |
| 6,085,202 | A * | 7/2000 | Rao et al. ............... 707/509 |
| 6,094,648 | A | 7/2000 | Aalbersberg et al. |
| 6,101,503 | A | 8/2000 | Cooper et al. |
| 6,131,092 | A | 10/2000 | Masand |
| D435,561 | S | 12/2000 | Pettigrew et al. |
| 6,182,090 | B1 | 1/2001 | Peairs |
| D439,585 | S | 3/2001 | Law et al. |
| 6,222,547 | B1* | 4/2001 | Schwuttke et al. ......... 345/419 |
| D445,802 | S | 7/2001 | Greminger |
| 6,259,458 | B1* | 7/2001 | Theisen et al. ............ 345/440 |
| 6,275,229 | B1* | 8/2001 | Weiner et al. ............... 345/764 |
| D449,050 | S | 10/2001 | Graham |
| 6,335,730 | B1* | 1/2002 | Gould ....................... 345/784 |
| 6,339,437 | B1 | 1/2002 | Nielsen |
| 6,369,811 | B1 | 4/2002 | Graham et al. |
| D456,817 | S | 5/2002 | Graham |
| 6,457,026 | B1 | 9/2002 | Graham et al. |
| 6,553,373 | B2 | 4/2003 | Boguraev et al. |
| 6,582,475 | B2 | 6/2003 | Graham et al. |
| 6,681,370 | B2 | 1/2004 | Gounares et al. |
| 2002/0065814 | A1 | 5/2002 | Okamoto et al. |
| 2003/0051214 | A1 | 3/2003 | Graham et al. |

FOREIGN PATENT DOCUMENTS

| | | |
|---|---|---|
| EP | 378 848 A2 | 7/1990 |
| EP | 459 174 A2 | 4/1991 |
| EP | 737 927 A2 | 10/1996 |
| EP | 762 297 A2 | 3/1997 |
| EP | 802 492 A1 | 10/1997 |
| GB | 2137788 A | 10/1984 |
| GB | 2156118 A | 10/1985 |
| GB | 2234609 A | 2/1991 |
| GB | 2290898 A | 1/1996 |
| GB | 2 332 544 A | 6/1999 |
| JP | 02-001057 | 1/1990 |
| JP | 06-203024 | 7/1994 |
| JP | 08-255163 | 10/1996 |
| JP | 8-297677 A | 11/1996 |
| JP | 11-213011 | 8/1999 |
| WO | WO 97/12328 A1 | 4/1997 |

OTHER PUBLICATIONS

Ball, Thomas et al., *Software Visualization in the Large*, IEEE Computer, vol. 29, No. 4, Apr. 1996. pp. 33-43.

Hill, William C.et al., *Edit Wear and Read Wear*, ACM, p. 3-9, 1992.

Boguraev et al., *Salience-Based Content Characterisation of Text Documents*, In Proceedings of the ACL/EACL Workshop on Intellegent [Sic] Scalable Text Summarization, 1997. Topic identification, Discourse-based summarization. pp. 1-12.

Brandow et al., "Automatic Condensation of Electronic Publications by Sentence Selection,"*Information Processing and Management*, 31(5):675-685 (1995).

Greenberg et al., (1995) *Sharing fisheye views in relaxed-WYSIWIS groupware applications*, Proceedings of Graphics Interface, Toronto, Canada, May 22-24, Distributed by Morgan-Kaufmann, pp. 28-38, http://www.cpsc.ucalgary.ca/grouplab/papers/1996/96-Fisheye.GI/gi96 fisheye.html.

Hearst, M., *TitleBars: Visualization of Term Distribution Information in Full Text Information Access*, Proceedings of the ACM SIGCHI Conference on Human Factors in Computing Systems (CHI), Denver CO., May 1995, pp. 1-8, http:/www.acm.org/sigchi/chi95/Electronic/documents/papers/mah bdy htm.

Manber, U., "The Use of Customized Emphasis in Text Visualization," *1997 IEEE Conf. on Info. Visualization*, London, England, pp. 132-138 (1997).

Schweighofer et al., "The automatic Generation of Hypertext Links in Legal Documents," from *Lecture Notes in Computer Science 1134*,7th International Conference, DEXA '96, Zurich, Switzerland, pp. 889-889 (1996).

Sumita et al., "Document Structure Extraction for Interactive Document Retrieval Systems," *Proceedings of SIGDOC '93*, Getting in Touch—Staying in Touch, pp. 301-310 (1993).

Taghva et al., "An Evaluation of an Automatic Markup System," *SPIE*, 2422:317-327 (1995).

Adobe Systems, Inc., "Adobe Photoshop 4.0 User Guide for Macintosh and Windows," Title Page, Copyright Page, Chap. 2, pp. 30-31 (1996).

Adobe Acrobat Reader 3.0 screen dumps (1996).

Apple computer, Inc., "Getting Help" and "Turning Balloon Help" Macintosh Data Book, Reference 7 System, in Chapter 1 entitled "A Review of Standard Macintosh Operations," pp. 30-31 (1991). Photoshoot 4.0, pp. 30-31.

Acrobat Reader Version 2.0 (software application), Adobe Systems Incorporated, screenshots Figures 1-10 (1994).

Balasubramanian, V., *State of the Art Review on Hypermedia Issues And Applications*, chapter 5—Information Retrieval Issues, E-Papyrus, Inc., Apr. 1998 (downloaded from website on Dec. 15, 2004) on the internet: <http://www.e-papyrus.com/hypertext_review/index.html>.

Byrd, D., "A Scrollbar-based Visualization for Document Navigation," doc. ID: xxx.cs.IR/9902028, Computing Research Repository Information Retrieval (1999).

Adobe Systems Incorporated, Acrobat Reader, 1999, Adobe Systems Incorporated, Version 4.0 pp. 1-5.

Hart, Peter E. and Graham, Jamey, Query-Free Information Retrieval, Oct. 1997, IEEE Cooperative Information Systems, pp. 32-37.

Amati et al., "A Framework for Filtering News and Managing Distributed Data," *J. Universal Comp. Sci.*, 3(8):1007-1021 (1997).

"Flexible JAMM Screenshots," downloaded from internet site http://simon.cs.ct.edu/-jamm May 4, 2000.

"c:\. . . \9149920c.wpd—unmodified" Screen Shots of document created in Corel WordPerfect, 4 pages, (Apr. 30, 2002).

Begole et al., "Flexible Collaboration Transparency," doc. ID: ncstrl.vatech_cs/TR-98-11, Virginia Polytechnic Institute and State University (1998).

Begole et al., "Supporting Worker Independence in Collaboration Transparency," doc. ID: ncstrl.vatech_cs/TR-98-12, Virginia Polytechnic Institute and State University (1998).

Gliedman, J., "Virtual Office Managers," *Computer Shopper*, 18(9):290 (1998).

IBM Technical Disclosure Bulletin, "Quick Selection of Window Environment Coordinates," 35:57-60, ISS #4B, (1992).

Lam et al. "Automatic document classification based on probabilistic reasoning: model and performance analysis," *IEEE*, 3:2719-2723 (1997).

Langley, P., "An Analysis of Bayesian Classifiers," *Proceedings of 10th National Conference on Artifical Intelligence*, pp. 223-228 (1992).

Langley, P., "Induction of Selective Bayesian Classifiers," *Proceedings of 10th National Conference on Uncertainty in Artifical Intelligence*, pp. 400-406 (1994).

Taxt, T., "Segmentation of Document Images," *IEEE*, 11(12):1322-1329 (1989).

* cited by examiner

2D GRAPH DISPLAYING DOCUMENT LOCATIONS OF USER-SPECIFIED CONCEPT OF INTEREST

CROSS-REFERENCES TO RELATED APPLICATIONS

This application incorporates by reference the following commonly owned co-pending U.S. patent application in its entirety for all purposes:

U.S. patent application Ser. No. 08/995,616, now abandoned, Entitled, "AUTOMATIC ADAPTIVE DOCUMENT HELP SYSTEM."

BACKGROUND OF THE INVENTION

The present invention relates to electronic documents and more particularly to method and system for providing interest profiles for electronic documents with features to enhance the experience of reading or using the electronic document.

Increasingly, readers of documents are being called upon to assimilate vast quantities of information in a short period of time. To meet the demands placed upon them, readers find they must read documents "horizontally," rather than "vertically," i.e., they must scan, skim, and browse sections of interest in multiple documents rather than read and analyze a single document from beginning to end.

Documents are becoming more widely available in electronic form. Some documents are available electronically by virtue of their having been created using word processing software. Other electronic documents are accessible via the Internet. Yet others may become available in electronic form by virtue of being scanned in, copied, or faxed. Commonly assigned U.S. application Ser. No. 08/754,721, U.S. Pat. No. 5,978,477, entitled AUTOMATIC AND TRANSPARENT DOCUMENT ARCHIVING, the contents of which are incorporated herein by reference for all purposes, details a system for generating electronic as well as hardcopy format of documents.

However, the mere availability of documents in electronic form does not assist the reader in confronting the challenges of assimilating information quickly.

Certain tools take advantage of the electronic form documents to assist harried readers. Tools exist to search for documents both on the Internet and locally. Once a document is identified and retrieved, automatic summarization techniques, such as the Reader's Helper™, described in a commonly owned copending U.S. patent application Ser. No. 08/995,616, now abandoned, entitled AUTOMATIC ADAPTIVE DOCUMENT HELP SYSTEM, the contents of which are incorporated herein by reference for all purposes, helps the reader to find as well as assimilate the information he or she wants more quickly.

What is needed is a document interest profiling method that helps the reader find the information he or she wants more quickly. The document interest profiling method should be easily personalized, flexible and adaptive as well.

SUMMARY OF THE INVENTION

According to one embodiment of the present invention, methods and systems for displaying an interest profile for an electronically stored document are provided. Interest profiles provide features that can enhance the experience of reading or using the electronic document. In exemplary embodiments, methods and systems include one or more interest profile techniques, such as graphical presentations and the like, for browsing or searching documents are provided. The graphical presentation can provide information about content of a document. The invention can be embodied in computer systems that include user input devices, processors, displays, storage and the like.

In an exemplary embodiment, a method for providing an interest profile includes a variety of steps. A step of accepting from a user input indicating the user's specified concepts of interest can be part of the method. The method can also include analyzing an electronically stored document to identify locations of discussion of the user-specified concept of interest. Techniques for determining locations of concepts of interest can be used with the method, such as keyword counting, Bayesian analysis techniques described in a commonly owned copending U.S. patent application Ser. No. 08/995,616, now abandoned, entitled AUTOMATIC ADAPTIVE DOCUMENT HELP SYSTEM, and the like, in various embodiments of the present invention. The method also displays an indication of presence of discussion about the concepts of interest within the electronically stored document. The indication can provide to a reader approximate positions of portions of the document relevant to the concept of interest.

In some embodiments, the indication can be a graphical representation of the presence of one or more concepts of interest to the reader. The graph can also indicate a persistence of the concept at various locations within the document by showing a relative amount of discussion of the concepts at various locations within the document. Embodiments can provide graphical presentations including contours, bar charts, scatter plots, and the like.

In another aspect according to the present invention, a method for providing an interest profile for an electronically stored document comprises a number of steps, such as accepting user input indicating user-specified concepts of interest and analyzing the electronically stored document to identify locations of discussion of the user-specified concepts of interest. The method can include displaying one or more selectable concept indicators corresponding to particular concepts of interest and accepting user input selecting at least one of these concept indicators. The method can also include displaying an indication of presence of discussion about one or more of the concepts of interest within the electronically stored document. The indication of presence can comprise a contour graph image corresponding to the electronically stored document that indicates a relative presence of discussions of at least one of the concepts of interest based upon the selections made by the user.

Some embodiments can also include displaying a second indication of presence of the concepts of interest comprising an elongated thumbnail image of all or a portion of electronically stored document in another viewing area of the display. The thumbnail image can have one or more indications of locations of discussion of concepts of interest based upon the concept or concepts selected by the user. Further, some embodiments will display the second indication juxtaposed to the first indication, enabling the user to visually compare the two indications.

In another aspect according to the present invention, a computer program product for providing an interest profile for an electronically stored document comprises a computer readable storage medium containing code for performing a variety of tasks. The product can comprise code for accepting user input indicating user-specified concepts of interest and code for analyzing the electronically stored document to identify locations of discussion of user-specified concepts of interest. The program product can also include code for displaying an indication of presence of discussion about concepts of interest within the electronically stored document. The indication can provide a reader an approximate position of discussion within the electronically stored document.

In another aspect according to the present invention, a system for providing an interest profile for an electronically stored document can include a memory, a display and a processor interconnected to the memory and the display by a bus. The processor can perform tasks such as accepting user input indicating user-specified concepts of interest and analyzing the electronically stored document to identify locations of discussion of the user-specified concept of interest. The processor can also display an indication of presence of discussion about the concepts of interest within the electronically stored document on the display. The indication can provide a reader an approximate position of the discussion within the electronically stored document.

Numerous benefits are achieved by way of the present invention over conventional techniques. The present invention can provide an interest profile of a document for the reader. In many embodiments, the interest profile can be easily personalized to the user. Some embodiments are easier to use than conventional browser user interfaces. Embodiments according to the invention can provide more information to the reader of a document than known techniques. Many embodiments according to the invention will enhance the user's reading or web browsing experience by providing indication of which portions of documents are likely to be of most interest to the reader. These and other benefits are described throughout the present specification.

A further understanding of the nature and advantages of the inventions herein may be realized by reference to the remaining portions of the specification and the attached drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DESCRIPTION OF THE SPECIFIC EMBODIMENTS

The present invention provides interest profiles for electronic documents to enhance the experience of reading or using the document. In exemplary embodiments, methods and systems including a graphical presentation of an interest profile assist the user in browsing or searching documents. The graphical presentation can provide information about content of a document, for example. The invention can be embodied in computer systems that include user input devices, processors, displays, storage and the like.

Figure 1A:
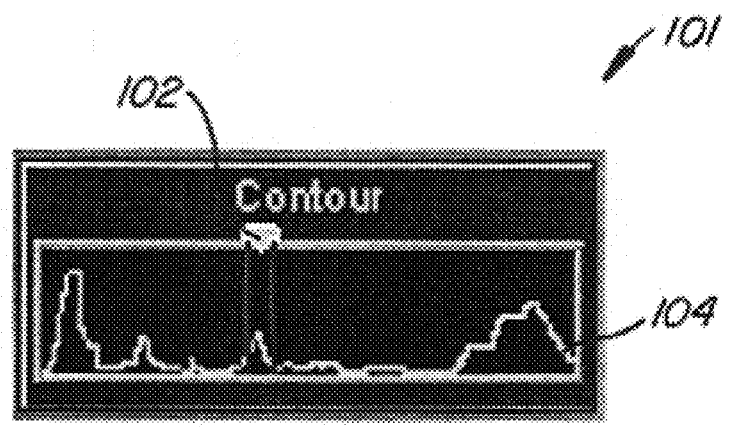
FIGS. 1A–1B illustrate document interest profiles in particular embodiments according to the present invention.

FIG. 1A is an illustration of a representative document interest profile image in a particular embodiment according to the present invention. This diagram is merely an example which should not limit the scope of the claims herein. One of ordinary skill in the art would recognize many other variations, alternatives, and modifications. FIG. 1A illustrates an annotation contour graphical presentation 101 of a document interest profile. Annotation contour 101 presents a profile view of a document based on a persistence measure of a concept within the document. A persistence measure can be a number of annotations ("hits") in the document, for example. Reference may be had to a commonly owned, co-pending U.S. patent application Ser. No. 08/995,616, entitled, "AUTOMATIC ADAPTIVE DOCUMENT HELP SYSTEM," incorporated herein by reference in its entirety for all purposes, for a detailed explanation of analyzing a document's content.

Annotation contour 101 can show the concentration, or persistence, of annotations throughout an entire document, or in portions of the document. Annotation contours can assist users viewing long documents. While annotation contour 101 comprises a line graph format, those of ordinary skill in the art can readily appreciate that other presentation formats, such as bar charts, scatter plots and the like can also be used without departing from the scope of the present invention. Annotation contour 101 comprises a page pointer 102 that can be dragged to a location on a graphical representation of the document contents 104 by the user using a pointing device, such as a mouse, for example. Responsive to the user's positioning the page pointer to a position in the graphical document representation, the display screen will reposition to display a corresponding location within the document. In this manner, the user can evaluate where the concentration of a concept of interest is within the document and move to this position within the document by sliding the page pointer to a corresponding location on the graphical representation of the document. In a presently preferable embodiment, the distance between the vertical lines of page pointer 102 is approximately 1 page length. However, other lengths can be used without departing from the scope of the present invention.

Figure 1B:
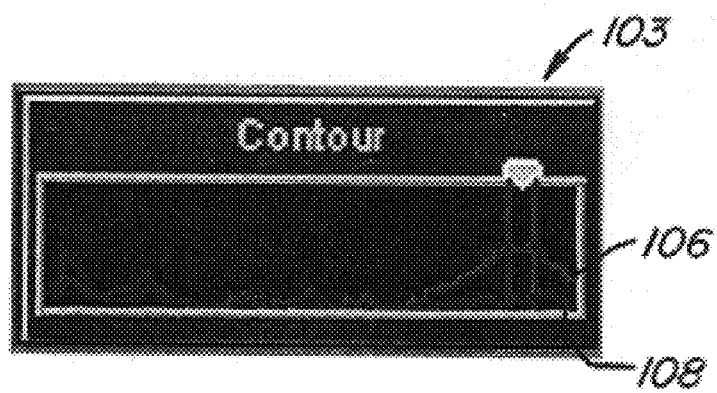

FIG. 1B is an illustration of another representative document interest profile image in a particular embodiment according to the present invention. This diagram is merely an example which should not limit the scope of the claims herein. One of ordinary skill in the art would recognize many other variations, alternatives, and modifications. FIG. 1B illustrates an annotation contour graphical presentation 103 of a document interest profile. Annotation contour 103 presents a profile view of a document based on a persistence measure of two concepts within the document. Annotation contour 103 comprises a graphical representation 106 corresponding to the persistence of a first concept of interest within the subject document, and a graphical representation 108 corresponding to the persistence of a second concept of interest within the subject document. While annotation contour 103 has been discussed with two concepts of interest, those of ordinary skill in the art can readily appreciate that the method is easily extendible to any number of concepts of interest without departing from the scope of the present invention.

In an alternative embodiment, a single contour can be used to indicate presence or persistence of multiple concepts of interest. In such an embodiment, the contour can display a result of a manipulation of constituent presence or persistence measurements. For example, information about the presence or persistence of two concepts of interest can be added, and a contour can be displayed showing the result of the addition. Other manipulations, such as subtraction of one interest profile from another, scaling by a scalar or functional factor, and the like are embodiments within the scope of the present invention.

Figure 2:
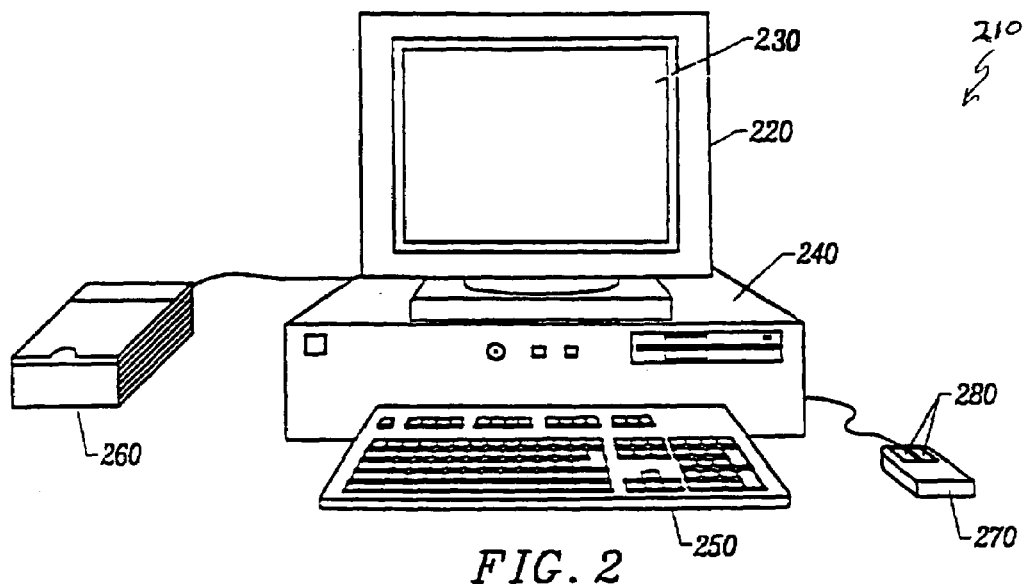
FIG. 2 is an illustration of a system in a particular embodiment according to the present invention.

FIG. 2 is an illustration of a representative system suitable for implementing the according to a particular embodiment of the present invention. This diagram is merely an example which should not limit the scope of the claims herein. One of ordinary skill in the art would recognize many other variations, alternatives, and modifications. FIG. 2 depicts but one example of many possible computer types or configurations capable of being used with the present invention. Embodiments according to the invention can be implemented in a single application program such as a browser, or may be implemented as multiple programs in a distributed computing environment, such as a workstation, personal computer or a remote terminal in a client server relationship. FIG. 2 shows computer system 210 including display device 220, display screen 230, cabinet 240, keyboard 250, scanner 260 and mouse 270. Mouse 270 and keyboard 250 are representative "user input devices." Other examples of user input devices are a touch screen, light pen, track ball, data glove and so forth. FIG. 2 is representative of but one type of system for embodying the present invention. It will be readily apparent to one of ordinary skill in the art that many system types and configurations are suitable for use in conjunction with the present invention.

In a preferred embodiment, computer system 210 includes a Pentium® class based computer, running Windows® NT operating system by Microsoft Corporation. However, the method is easily adapted to other operating systems and architectures without departing from the scope of the present invention.

Mouse 270 may have one or more buttons such as buttons 280. Cabinet 240 houses familiar computer components such as disk drives, a processor, storage means, etc. As used in this specification "storage means" includes any storage device used in connection with a computer system such as disk drives, magnetic tape, solid state memory, bubble memory, etc. Cabinet 240 may include additional hardware such as input/output (I/O) interface cards for connecting computer system 210 to external devices such as a scanner 260, external storage, other computers or additional peripherals.

Figure 3:
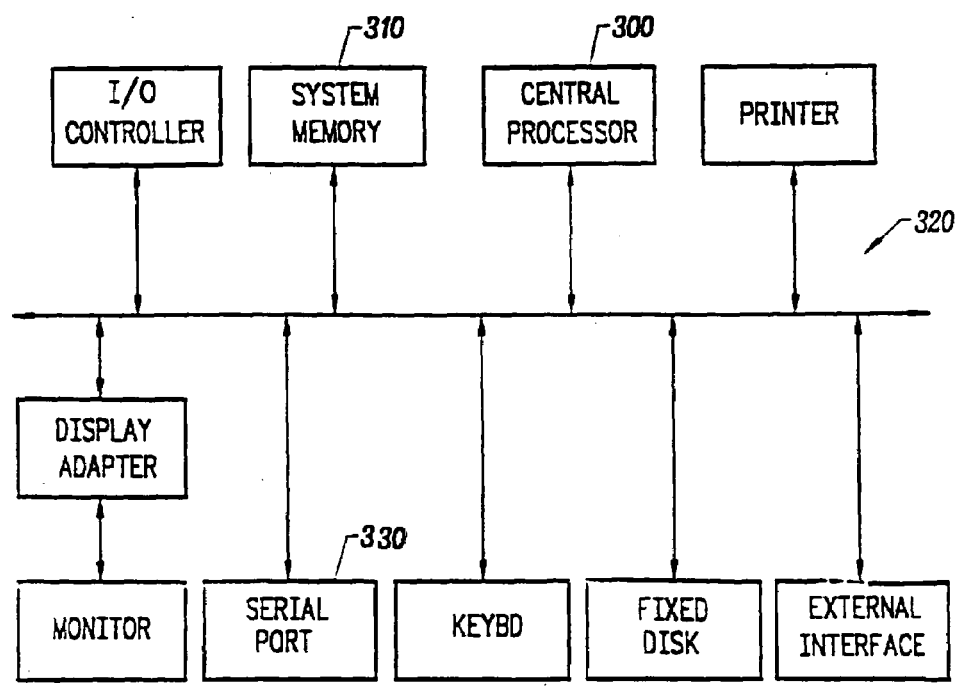
FIG. 3 is an illustration of basic subsystems of the system of FIG. 2.

FIG. 3 is an illustration of basic subsystems in computer system 210 of FIG. 2. In FIG. 3, subsystems are represented by blocks such as central processor 300, system memory 310, etc. This diagram is merely an example which should not limit the scope of the claims herein. One of ordinary skill in the art would recognize many other variations, alternatives, and modifications. The subsystems are interconnected via a system bus 320. Additional subsystems such as a printer, keyboard, fixed disk and others are shown. Peripherals and input/output (I/O) devices can be connected to the computer system by any number of means known in the art, such as serial port 330. For example, serial port 330 can be used to connect the computer system to a modem, a mouse input device, or a scanner. The interconnection via system bus 320 allows central processor 300 to communicate with each subsystem and to control the execution of instructions from system memory 310 or the fixed disk, as well as the exchange of information between subsystems. Other arrangements of subsystems and interconnections are readily achievable by those of ordinary skill in the art. System Memory 310, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 4:
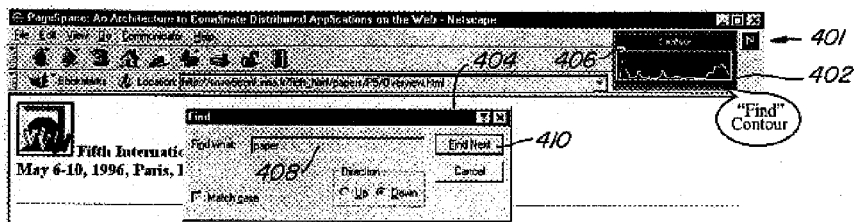
FIG. 4 illustrates a representative screen display in a particular embodiment according to the present invention.

FIG. 4 illustrates a representative browser user interface 401 having a document interest profile display 402 which can be displayed on display screen 230 of FIG. 2, in a particular embodiment according to the present invention. This diagram is merely an example which should not limit the scope of the claims herein. One of ordinary skill in the art would recognize many other variations, alternatives, and modifications. FIG. 4 illustrates an example use of an annotation contour 402 in conjunction with a find command box 404 for searching through the current document of interest, such as a page from the world wide web, for example, for information about one or more concepts of interest. As shown in FIG. 4, a user has entered a topic, "paper" in a field within the find command box 404. By clicking on the "find next" button, the user can move through the document from one instance of the word "paper" to the next. Additionally, annotation contour 402 indicates a persistence of the term "paper" within the document. A page pointer 406 at the top of annotation contour 402, can provide an indication of the relative position of the current page displayed to the user in the display window.

Figure 5:
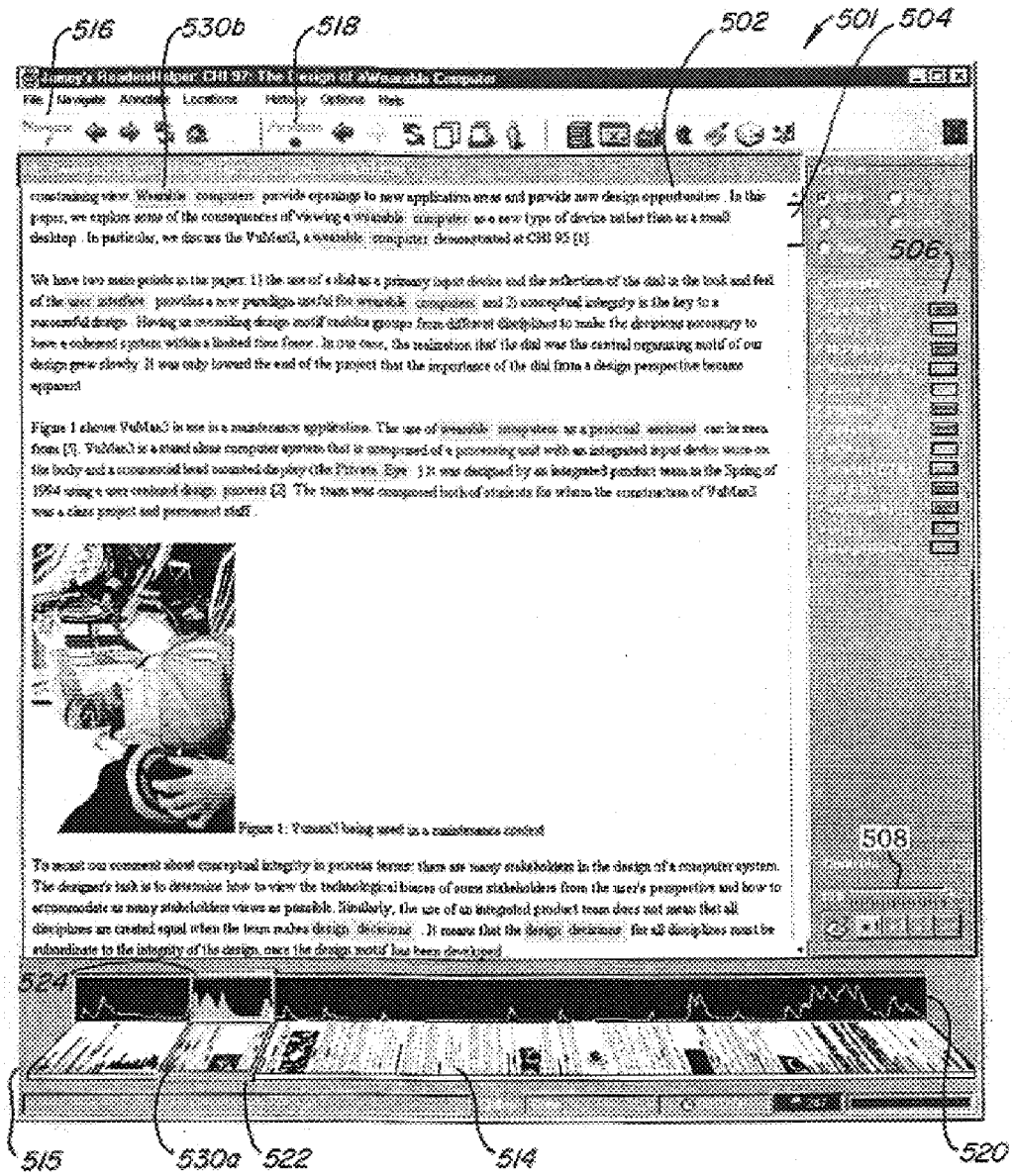
FIG. 5 illustrates a representative screen display in an alternative embodiment according to the present invention.

FIG. 5 illustrates another representative browser user interface having a document interest profile display 502 which can be displayed on display screen 230 of FIG. 2, in a particular embodiment according to the present invention. This diagram is merely an example which should not limit the scope of the claims herein. One of ordinary skill in the art would recognize many other variations, alternatives, and modifications. FIG. 5 illustrates a user interface 501 for viewing an annotated document online. Annotations can be added to a document in a variety of ways, such as described in a commonly owned copending U.S. patent application Ser. No. 08/995,616, now abandoned, entitled AUTOMATIC ADAPTIVE DOCUMENT HELP SYSTEM, which is incorporated herein by reference in its entirety for all purposes. A first viewing area 502 in user interface 501 shows a section of an electronic document. Using a scroll bar 504, or in other ways, the user may scroll the displayed section through the electronic document.

Some embodiments can include a series of concept indicators 506 that permit the user to identify which concepts of interest are to be noted in the document. A sensitivity control 508 permits the user to select the degree of sensitivity to apply in identifying potential locations of relevant discussion. At low sensitivity, more locations will be denoted as being relevant, even though some may not be of any actual interest. At high sensitivity, most all denoted locations will in fact be relevant but some other relevant locations may be missed. Many embodiments provide a percentage giving the relevance of the currently viewed document to the concept for each concept name appearing by one of selectable concept indicators 506. These relevance levels offer a quick assessment of the relevance of the document to the selected concepts.

In many embodiments, an elongated thumbnail image 514 representing the contents of the document is provided in a second viewing area 515. Thumbnail image 514 depicts a representation of the contents of the document, the current location of the reader, i.e., the location of the text displayed in section 502, using a sliding window 522, as well as annotations corresponding to locations of discussion of concepts of interest to the reader, such as annotation 530*a* that corresponds to annotation 530*b* in the document displayed in viewing area 502. An annotation contour 520 can be displayed along with elongated thumbnail image 514. Annotation contour 520 can provide an indication of the presence of one or more concepts of interest to the reader within the document. A second sliding window 524 provides a counter part to sliding window 522. Counterpart sliding window 524 can be positioned along the annotation contour 520, to enable the user to find discussions of the topics of interest within the document.

In some embodiments, one or more navigation tools can be found on a navigation toolbar 516. Miscellaneous annotation tools can be found on an annotation toolbar 518. The annotation tools on annotation toolbar 518 facilitate navigation through a collection of documents. Annotations may be added to the document text to denote relevance to user-selected concepts of interest.

Figure 6A:
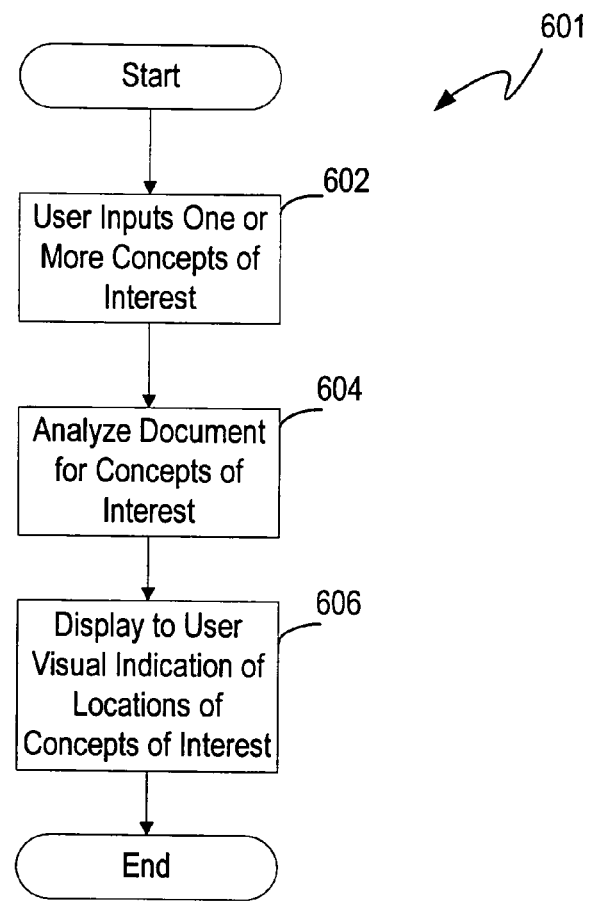
FIGS. 6A–6B illustrate simplified flowcharts of representative process steps in particular embodiments according to the present invention.

FIG. 6A illustrates a flowchart 601 of simplified process steps in a particular representative embodiment according to the invention for creating a document interest profile. This diagram is merely an example which should not limit the scope of the claims herein. One of ordinary skill in the art would recognize many other variations, alternatives, and modifications. The method is preferably embodied as software processes executing in a computer system that includes a user input device coupled to a processor, a display and a memory. In a step 602, user input indicating user-specified concepts of interest is accepted. Next, in a step 604, the electronic document is analyzed in order to identify locations of discussion of the concepts of interest to the user specified in step 602. Then, in a step 606, the electronic document is displayed, with an indication to the reader of the presence of the concepts of interest within the document. The indication can take the form of a contour graph that indicates the relative strength of the concept of interest at various points within the document. In some embodiments, a pointer associated with the graph can provide an indication to a reader of an approximate position of a currently displayed portion of the document, using a 'sliding window' style indication.

Figure 6B:
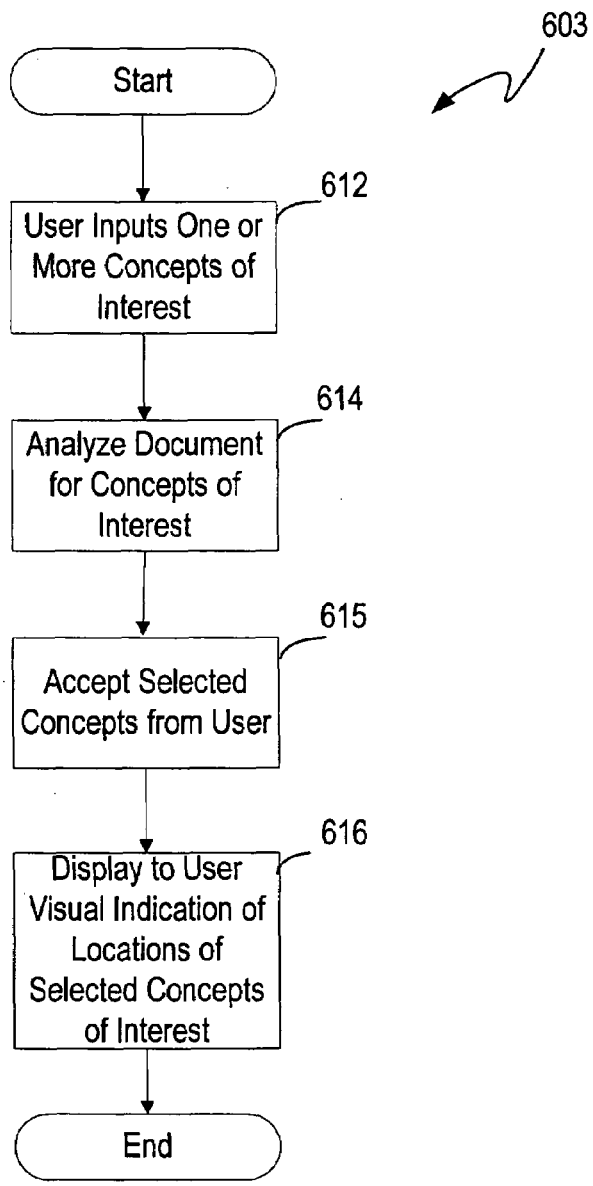

FIG. 6B illustrates a flowchart 603 of simplified process steps in another representative embodiment according to the invention for creating a document interest profile. This diagram is merely an example which should not limit the scope of the claims herein. One of ordinary skill in the art would recognize many other variations, alternatives, and modifications. FIG. 6B illustrates a step 612, wherein user input indicating user-specified concepts of interest is accepted. Next, in a step 614, the electronic document is analyzed in order to identify locations of discussion of the concepts of interest to the user specified in step 612. In a step 615, input from the user selecting one or more concepts of interest is accepted. Input can be received from the user clicking on icons with the mouse, or the like. Then, in a step 616, the electronic document is displayed, with an indication to the reader of the presence of the concepts of interest selected by the user in step 615. The indication can take the form of a contour graph that indicates the relative strength of the concept of interest at various points within the document. In some embodiments, a pointer associated with the graph can provide an indication to a reader of an approximate position of a currently displayed portion of the document, using a 'sliding window' style indication.

Some embodiments will also include a document thumbnail image to provide summary information, and the like.

FIGS. 7A–7D illustrate representative screens in examples of particular embodiments according to the present invention. In the examples of FIGS. 7A–7D, a user is using an exemplary embodiment to learn about wearable computers. Other references about these topics, as well as other topics can be viewed using various embodiments according to the present invention. Thus, the screens of FIGS. 7A–7D are intended to exemplary and not limiting.

Figure 7A:
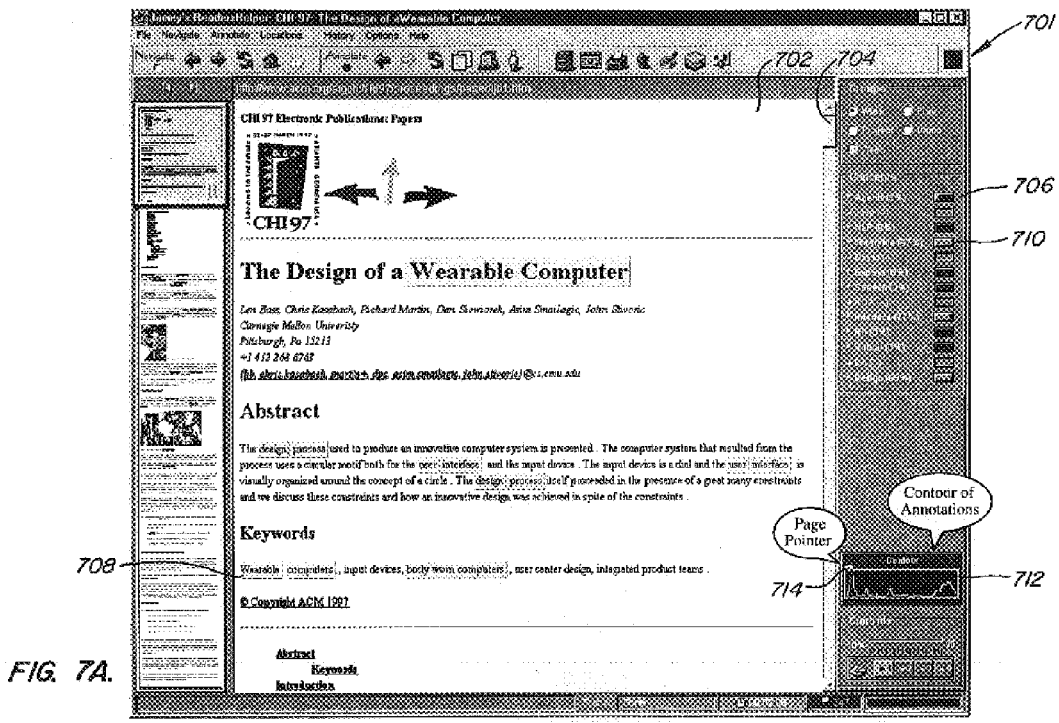
FIGS. 7A–7D illustrate a representative example of browsing documents in a particular embodiment according to the present invention.

FIG. 7A illustrates a representative screen in an example search or browsing of a web based document in a particular embodiment according to the present invention. This diagram is merely an example which should not limit the scope of the claims herein. One of ordinary skill in the art would recognize many other variations, alternatives, and modifications. FIG. 7A illustrates a browser user interface 701 for viewing an annotated document online. A first viewing area 702 in user interface 701 shows a section of an electronic document. A scroll bar 704 provides the user with the ability to scroll the displayed section through the electronic document. A plurality of selectable concept indicators 706 permit the user to identify which concepts of interest are to be noted in the document. A percentage gives the relevance of the currently viewed document to the concept for each concept name appearing by one of selectable concept indicators 706. These relevance levels offer a quick assessment of the relevance of the document to the selected concepts. An annotation 708 indicates the presence of the word "wearable" within the body of the document. "Wearable" is a concept of interest denoted by concept of interest indicator 710.

Annotation contour 712 provides an "activity indication" of the locations of the annotations, such as annotation 708, within the document. The graph of annotation contour 712 indicates a relative number of annotations throughout the document. Other types of indicators, such as bar graphs, scatter plots and the like can also be used to provide information about the location and number of annotations within the document in other embodiments according to the present invention. Page pointer 714 indicates the relative position of the currently displayed page of viewing area 702 within the document. The user can move page pointer 714 along annotation contour 712 in order to position the document in the first viewing area 702 to a portion of the document having a high concentration of instances of annotations.

Figure 7B:
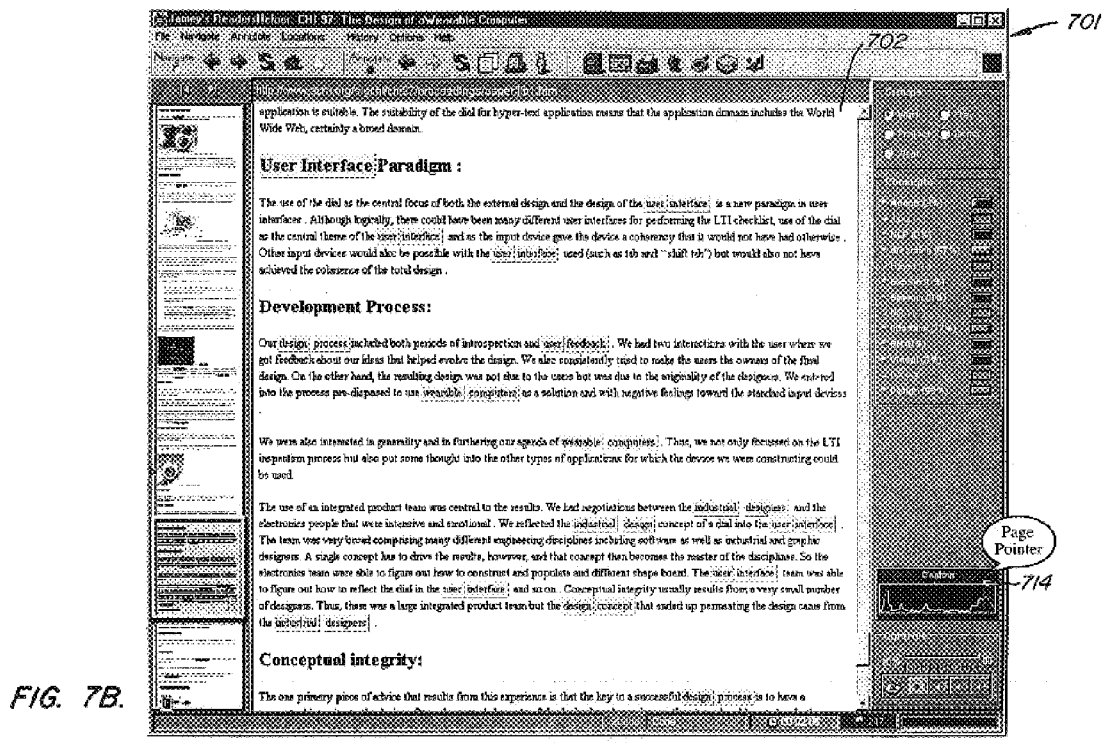

FIG. 7B illustrates another representative screen in the example search or browsing of a web based document in a particular embodiment according to the present invention. This diagram is merely an example which should not limit the scope of the claims herein. One of ordinary skill in the art would recognize many other variations, alternatives and modifications. FIG. 7B illustrates browser 701 wherein a user has repositioned page pointer 714 to a portion of the document having relatively many instances of annotations for a particular concept. Display viewing area 702 now depicts a portion of the document corresponding to the placement of the page pointer by the user. In this way, the user can quickly locate portions of a large document having material about concepts of interest to the user by sliding the page pointer to an apparent "hot spot" within the document.

Figure 7C:
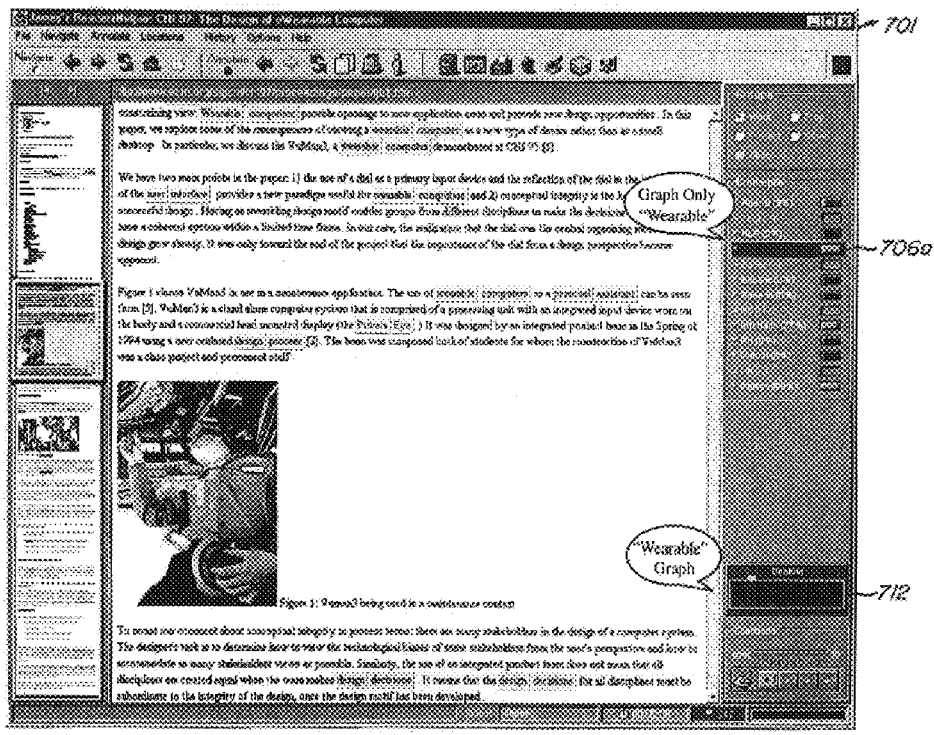

FIG. 7C illustrates a further representative screen in an example search or browsing of a web based document in a particular embodiment according to the present invention.

This diagram is merely an example, which should not limit the scope of the claims herein. One of ordinary skill in the art would recognize many other variations, alternatives and modifications. FIG. 7C illustrates browser 701 wherein the user has selected an individual concept, "wearable" as being of interest. The user selects a concept indicator 706*a* corresponding to the concept "wearable" from among the selectable concept of interest indicators 706. Annotation contour 712 depicts the relative occurrence of the selected concept, "wearable" within the document.

Figure 7D:
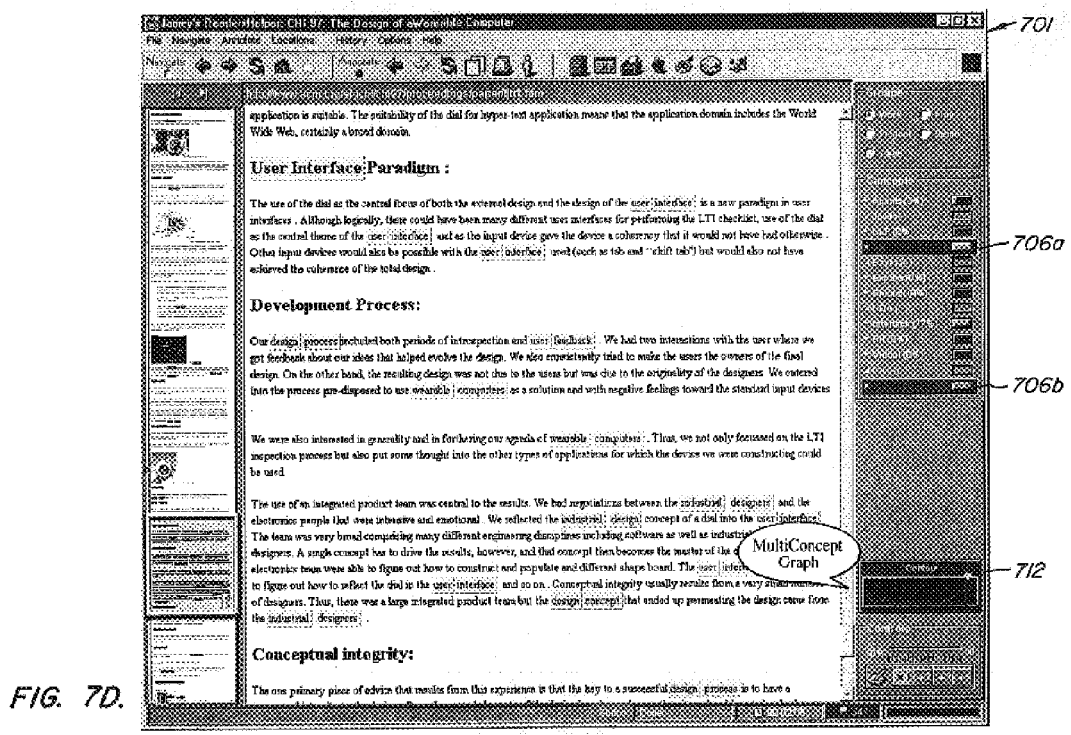

FIG. 7D illustrates a yet further representative screen in an example search or browsing of a web based document in a particular embodiment according to the present invention. This diagram is merely an example, which should not limit the scope of the claims herein. One of ordinary skill in the art would recognize many other variations, alternatives and modifications. FIG. 7D illustrates browser 701 wherein the user has selected two concepts, "wearable," and "design" as being of interest. The user selects a concept indicator 706*a* corresponding to the concept "wearable," and a concept indicator 706*b* corresponding to the concept "design" from among the selectable concept of interest indicators 706. Annotation contour 712 depicts the relative occurrence of the selected concept, "wearable" within the document.

In conclusion, the present invention provides for a method of providing an interest profile for documents. In the foregoing specification, the invention has been described with reference to a specific exemplary embodiments thereof. Many changes or modifications are readily envisioned. For example, changing the size or arrangement of the document interest profile image in the display, changing the appearance and features of document interest profile image by using different graphing methods and other types of depictions; adding audio effects; adding audio memos describing the contents of the document, among other changes, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A method of displaying an electronically stored document, said method comprising:
   receiving user input identifying a user-specified concept of interest;
   analyzing said electronically stored document to identify occurrences of discussion of said user-specified concept of interest in the electronically stored document; and
   displaying a visual indicator showing persistence values of the user-specified concept of interest at locations within the electronically stored document, the persistence values of the user-specified concept of interest at the locations determined based upon a number of the occurrences of discussion of the user-specified concept of interest at the locations,
      wherein, for a location within the electronically stored document, the visual indicator displays a persistence value of the user-specified concept of interest at that location relative to persistence values of the user-specified concept of interest at other locations in the electronically stored document,
      wherein the visual indicator comprises a first axis representing locations within the electronically stored document and a second axis representing persistence values of a user-specified concept of interest.

2. The method of claim 1 wherein said visual indicator comprises a contour graph image.

3. The method of claim 1 wherein said visual indicator comprises a line graph.

4. The method of claim 1 wherein said visual indicator comprises a bar graph.

5. The method of claim 1 wherein said visual indicator comprises a scatter diagram.

6. The method of claim 1 further comprising:
   displaying an elongated thumbnail image of a portion of said electronically stored document in a viewing area of a display, wherein portions of said elongated thumbnail image corresponding to said occurrences of discussion in said portion of the electronically stored documents are annotated.

7. The method of claim 1 further comprising:
   displaying a section of said electronically stored document on a display; and
   displaying a slider on said visual indicator, said slider highlighting a section of said visual indicator corresponding to said section of said electronically stored document displayed on said display.

8. The method of claim 7 further comprising:
   accepting user input moving said slider to a second section of said visual indicator; and
   responsive to movement of said slider to said second section of said visual indicator, displaying a section of said electronically stored document corresponding to said second section of said visual indicator on said display.

9. A method of displaying an electronically stored document, said method comprising:
   receiving user input identifying a plurality of user-specified concepts of interest;
   displaying a plurality of selectable concept indicators, said selectable concept indicators corresponding to said user-specified concepts of interest;
   accepting user input selecting a first selectable concept indicator from said plurality of selectable concept indicators corresponding to a first user-specified concept of interest;
   analyzing said electronically stored document to identify occurrences in said electronically stored document where said first user-specified concept of interest is discussed; and
   displaying a visual indicator showing persistence values of the first user-specified concept of interest at locations in said electronically stored document, the persistence values of the first user-specified concept of interest at the locations determined based upon a number of the occurrences of discussion of the first user-specified concept of interest at the locations,
      wherein, for a location within the electronically stored document, the visual indicator displays a persistence value of the first user-specified concept of interest at that location relative to persistence values of the first user-specified concept of interest at other locations in the electronically stored document,
      wherein the visual indicator comprises a first axis representing locations within the electronically stored document and a second axis representing persistence values of a user-specified concept of interest.

10. The method of claim 9 further comprising:
accepting user input selecting a second selectable concept indicator from said plurality of selectable concept indicators corresponding to a second user-specified concept of interest; and
displaying, in the visual indicator, persistence values of the second user-specified concept of interest at the locations in said electronically stored document.

11. A computer program product stored on a computer readable medium for displaying an electronically stored document, said computer program product comprising:
code for receiving user input identifying a user-specified concept of interest;
code for analyzing said electronically stored document to identify occurrences of discussion of said user-specified concept of interest in the electronically stored document; and
code for displaying a visual indicator showing persistence values of the user-specified concept of interest at locations within the electronically stored document, the persistence values of the user-specified concept of interest at the locations determined based upon a number of the occurrences of discussion of the user-specified concept of interest at the locations,
wherein, for a location within the electronically stored document, the visual indicator displays a persistence value of the user-specified concept of interest at that location relative to persistence values of the user-specified concept of interest at other locations in the electronically stored document,
wherein the visual indicator comprises a first axis representing locations within the electronically stored document and a second axis representing persistence values of a user-specified concept of interest.

12. The computer program product of claim 11 wherein said visual indicator comprises a contour graph image.

13. The computer program product of claim 11 wherein said visual indicator comprises a line graph.

14. The computer program product of claim 11 wherein said visual indicator comprises a bar graph.

15. The computer program product of claim 11 wherein said visual indicator comprises a scatter diagram.

16. The computer program product of claim 11 further comprising:
code for displaying an elongated thumbnail image of a portion of said electronically stored document in a viewing area of a display, wherein portions of said elongated thumbnail image corresponding to said occurrences of discussion in said portion of the electronically stored documents are annotated.

17. The computer program product of claim 11 further comprising:
code for displaying a section of said electronically stored document on a display; and
code for displaying a slider on said visual indicator, said slider highlighting a section of said visual indicator corresponding to said section of said electronically stored document displayed on said display.

18. The computer program product of claim 17 further comprising:
code for accepting user input moving said slider to a second section of said visual indicator; and
code for displaying a section of said electronically stored document corresponding to said second section of said visual indicator on said display responsive to movement of said slider to said second section of said visual indicator.

19. A computer program product stored on a computer readable medium for providing an interest profile for an electronically stored document, said computer program product comprising:
code for receiving user input identifying a plurality of user-specified concepts of interest;
code for displaying a plurality of selectable concept indicators, said selectable concept indicators corresponding to said user-specified concepts of interest;
code for accepting user input selecting a first selectable concept indicator from said plurality of selectable concept indicators corresponding to a first user-specified concept of interest;
code for analyzing said electronically stored document to identify occurrences in said electronically stored document where said first user-specified concept of interest is discussed;
code for displaying a visual indicator showing persistence values of the first user-specified concept of interest at various locations in said electronically stored document, the persistence values of the first user-specified concept of interest at the locations determined based upon a number of the occurrences of discussion of the first user-specified concept of interest at the locations,
wherein, for a location within the electronically stored document, the visual indicator displays a persistence value of the first user-specified concept of interest at that location relative to persistence values of the first user-specified concept of interest at other locations in the electronically stored document,
wherein the visual indicator comprises a first axis representing locations within the electronically stored document and a second axis representing persistence values of a user-specified concept of interest.

20. The computer program product of claim 19 further comprising:
code for accepting user input selecting a second selectable concept indicator from said plurality of selectable concept indicators corresponding to a second user-specified concept of interest; and
code for displaying, in the visual indicator, persistence values of the second user-specified concept of interest at the locations in said electronically stored document.

21. A system for providing an interest profile for an electronically stored document, said system comprising:
a memory;
a display;
a processor, interconnected to said memory and said display by a bus, said processor operatively disposed to:
receive user input identifying a user-specified concept of interest;
analyze said electronically stored document to identify occurrences of discussion of said user-specified concept of interest in the electronically stored document; and
display a visual indicator showing persistence values of the user-specified concept of interest at locations within the electronically stored document, the persistence values of the user-specified concept of interest at the locations determined based upon a number of the occurrences of discussion of the user-specified concept of interest at the locations, wherein, for a location within the electronically stored document, the visual indicator displays a persistence value of the user-specified concept of interest at that location relative to persistence values of the user-specified concept of interest at other locations in the electronically stored document, wherein the visual indicator comprises a first axis representing locations within the electronically stored document and a second axis representing persistence values of a user-specified concept of interest.

22. The system of claim 21 wherein said visual indicator comprises a contour graph image.

23. The system of claim 21 wherein said visual indicator comprises a line graph.

24. The system of claim 21 wherein said visual indicator comprises a bar graph.

25. The system of claim 21 wherein said visual indicator comprises a scatter diagram.

26. The system of claim 21, wherein said processor is further operative to:

display an elongated thumbnail image of a portion of said electronically stored document in a viewing area of said display, wherein portions of said elongated thumbnail image corresponding to said occurrences of discussion in said portion of the electronically stored documents are annotated.

27. The system of claim 21 wherein said processor is further operative to:

display a section of said electronically stored document on said display; and display a slider on said visual indicator, said slider highlighting a section of said visual indicator corresponding to said section of said electronically stored document displayed on said display.

28. The system of claim 27, wherein said processor is further operative to:

accept user input moving said slider to a second section of said visual indicator; and display a section of said electronically stored document corresponding to said second section of said visual indicator on said display responsive to movement of said slider to said second section of said visual indicator.

29. A system for providing an interest profile for an electronically stored document, said system comprising:

a memory;

a display;

a processor, interconnected to said memory and said display by a bus, said processor operatively disposed to:

receive user input identifying a plurality of user-specified concepts of interest;

display a plurality of selectable concept indicators, said selectable concept indicators corresponding to said user-specified concepts of interest;

accept user input selecting a first selectable concept indicator from said plurality of selectable concept indicators corresponding to a first user-specified concept of interest;

analyze said electronically stored document to identify occurrences in said electronically stored document where said first user-specified concept of interest is discussed; and display a visual indicator showing persistence values of the first user-specified concept of interest at various locations in said electronically stored document, the persistence values of the first user-specified concept of interest at the locations determined based upon a number of the occurrences of discussion of the first user-specified concept of interest at the locations, wherein, for a location within the electronically stored document, the visual indicator displays a persistence value of the first user-specified concept of interest at that location relative to persistence values of the first user-specified concept of interest at other locations in the electronically stored document, wherein the visual indicator comprises a first axis representing locations within the electronically stored document and a second axis representing persistence values of a user-specified concept of interest.

30. The system of claim 29 wherein said processor is further operative to:

accept user input selecting a second selectable concept indicator from said plurality of selectable concept indicators corresponding to a second user-specified concept of interest; and display, in the visual indicator, persistence values of the second user-specified concept of interest at the locations in said electronically stored document.

31. A method of displaying an electronically stored document, the method comprising:

receiving user input identifying a first concept of interest and a second concept of interest;

analyzing said electronically stored document to identify occurrences of discussion of the first concept of interest and the second concept of interest in the electronically stored document;

determining persistence values of the first concept of interest at locations within the electronically stored document based upon the occurrences of discussion of the first concept of interest in the electronically stored document;

determining persistence values of the second concept of interest at locations within the electronically stored document based upon the occurrences of discussion of the second concept of interest in the electronically stored document;

determining combined persistence values of the first concept of interest and the second concept of interest at locations within the electronically stored document based upon the persistence values of the first concept of interest and the persistence values of the second concept of interest at locations within the electronically stored document; and displaying a visual indicator showing the combined persistence values of the first concept of interest and the second concept of interest at locations within the electronically stored document.

* * * * *